Aug. 31, 1943.	J. M. SIMPSON	2,328,303
CLUTCH CONTROL
Filed Nov. 5, 1941

Inventor:
John M. Simpson
By Edward C. Gritzbaugh
Atty.

Patented Aug. 31, 1943

2,328,303

UNITED STATES PATENT OFFICE 2,328,303

CLUTCH CONTROL

John M. Simpson, Muncie, Ind., assignor to Borg-Warner Corporation, Chicago, Ill., a corporation of Illinois Application November 5, 1941, Serial No. 417,926

7 Claims. (Cl. 192—.02)

My invention relates to controls for automotive vehicles for effecting a connection between a vehicle engine and its load and in particular to clutch controls which actuate power means for disengaging automotive clutches.

It is an object of my invention to provide an improved clutch control which actuates power clutch disengaging means and may therefore be easily operated and with which the engine clutch of the automobile may be disengaged the desired amount under the control of the driver whereby the driver may "slip" the clutch in the manner most desirable for smooth automobile operation.

It is another object of my invention to provide an improved clutch control of the type described with which means operated by power from the automobile engine may be controlled by the driver to disengage the automobile clutch as desired and which is also mechanically linked with the clutch for disengaging it. It is contemplated that the automobile driver shall ordinarily use the power means for operating the engine clutch but that the driver with the same clutch control used for actuating the power means may disengage the clutch when the motor is not in operation whereby the automobile may be taken out of gear, if necessary, before the engine is started.

It is a further object of my invention to provide an improved control for both mechanically and by power effecting a connection between an automobile engine and its load which has the added function of permitting engine starter actuation. The engine-load connecting means is preferably an engine clutch and the starter is preferably so arranged relative to the clutch release mechanism that operation of the engine starter is effected through the control after the control has first been used to disengage the engine clutch. It is thus contemplated that my improved clutch control shall have a three-fold function; namely, to control power means for disengaging the engine clutch, to mechanically disengage the engine clutch when the power means is incapable of operation, and to actuate the engine starter while the engine clutch is held disengaged by reason of its mechanical linkage with the clutch control.

In its preferred form my invention comprises a vacuum motor operatively connected with the operating lever of an automobile clutch, a conduit between the vacuum motor and the intake manifold of the automobile engine, a valve in the conduit, the valve being of the type having a perforated slidable plunger and being provided with a bleed opening adjacent its connection with that part of the conduit leading to the vacuum motor, a control rod on the valve plunger, a link between the valve and clutch lever adapted to be actuated by the valve plunger for disengaging the automobile clutch, and a switch for the starter motor of the automobile engine adapted to be actuated by the valve plunger and link.

Other objects, the advantages and the uses of the invention will become apparent after reading the following specification and claims, and after consideration of the drawing forming a part of this specification wherein:

Figure 1:
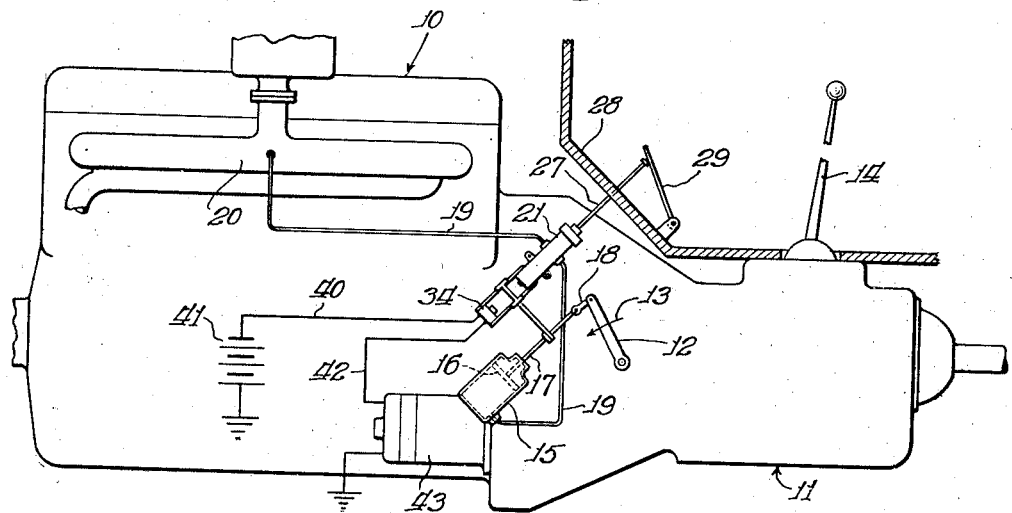
Fig. 1 is a schematic illustration of a motor vehicle engine and clutch and transmission assembly incorporating my improved clutch control.

Referring now to the drawing, the internal combustion engine 10 of an automotive vehicle is assembled in the usual manner with an engine clutch and speed change transmission assembly 11. The engine clutch may be of any ordinary type held normally in engaged condition by spring means and having an actuating lever 12 which when turned in the direction of the arrow 13 partially or totally disengages the clutch whereby only a small amount of power is transmitted through the clutch or the automobile engine is entirely disconnected from the transmission. The transmission may be of the type wherein a change in the gear ratio is effected upon manual movement of a gear shift lever 14 at such times as when the clutch lever 12 is turned to disengage the clutch.

A vacuum motor comprising an outer casing 15, a piston 16 slidably disposed in the casing, and an operator rod 17 connected with the piston is provided. The operator rod 17 is connected by means of a link 18 with the clutch lever 12. The vacuum motor is connected by means of a conduit 19 with the intake manifold 20 of the internal combustion engine. As is well known, a partial vacuum exists in the intake manifold of an internal combustion engine when the engine is in operation, and the intake manifold 20 thus serves as a vacuum source for the conduit 19 and the vacuum motor.

A valve comprising an outer casing 21 having ports 22 and 23 and a plunger 24 is connected in the conduit 19 between the intake manifold 20 and the vacuum motor with the conduit being connected to the valve casing 21 at the ports 22 and 23. The valve casing 21 is provided with a bleed opening 25 therein adjacent the port 23 for purposes hereinafter to be described. A cap 26 having a central opening is disposed on an end of the valve casing 21, and a clutch control rod 27 connected with the plunger 24 extends outwardly through the opening in the cap. The valve casing 21 is so disposed relative to the engine 10 and clutch and transmission assembly 11 that the clutch control rod 27 extends upwardly through the toe board 28 of the automobile. A hingedly mounted treadle 29 may be provided for actuating the rod 27.

Figure 2:
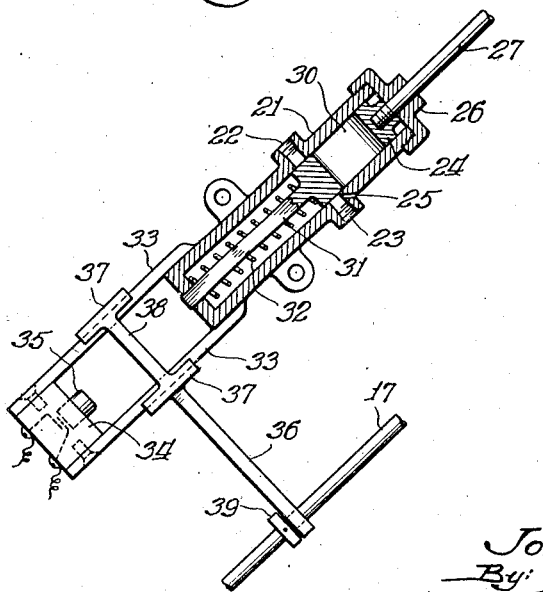
Fig. 2 is a sectional view through the operating valve of the clutch control.
Figure 3:
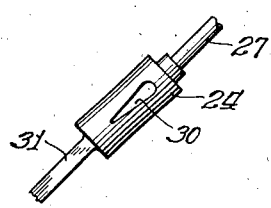
Fig. 3 is a fragmentary plan view of the plunger of the operating valve.

The plunger 24 is provided with an opening 30 therethrough having a width at one end which is substantially less than its width at its other end (see Fig. 3). The plunger 24 is provided with a stem portion 31 which extends downwardly through a central opening in the lower end of the valve casing 21. A compression spring 32 is disposed about the stem 31 and serves to hold normally the plunger 24 at the uppermost limit of its movement, substantially as is shown in Fig. 2.

Two rails 33 are connected with the valve casing 21 at opposite sides thereof. A switch unit 34, including a switch button 35 is connected between the rails 33 at their lower ends. A link 36 having grooved portions 37 and a web 38 between the grooved portions is slidably disposed on the rails 33 with the portions 37 fitting on the rails. The operator rod 17 of the vacuum motor passes through the link 36 and a washer 39 is fixed on the rod 17 whereby when the link 36 is moved downwardly on the rails 33, as will be henceforth described, the operator rod 17 is moved also in such direction.

The switch unit 34 is connected by a lead 40 with the battery 41 of the automobile and by a lead 42 with the starter motor 43 for the internal combustion engine 10. The switch unit 34 when its button 35 is depressed functions to complete an electrical circuit between the battery and the starter motor, and the motor is thus actuated.

When the internal combustion engine 10 is in operation, the engine clutch may be disengaged to a greater or less degree to provide the desired "slip" between the drive and driven elements of the clutch by depressing the treadle 29 a greater or less degree to bring the opening 30 of the plunger 24 at its narrower end or at a wider part thereof between the ports 22 and 23. When the treadle 29 is depressed only slightly and the opening 30 at its narrower end is brought between the ports 22 and 23, the pressure in the conduit 19 between the port 23 and the vacuum motor is lowered only slightly. By this pressure the plunger 16 of the vacuum motor is drawn only a short distance downwardly and the clutch lever 12 is rotated only through a small arc causing the engine clutch to "slip" only slightly. The bleed opening 25 in the valve casing 21 functions to admit air into the valve casing when the opening 30 is between the ports 22 and 23, and it keeps the pressure in the conduit 19 between the port 23 and the vacuum motor at a value which is constant but which is higher than that in the manifold 20 and in the conduit 19 between the manifold and the port 22. In order to increase the "slip" between the drive and driven elements of the clutch or to disengage the clutch entirely, it is only necessary to depress the treadle 29 further to bring the opening 30 at a wider part thereof between the ports 22 and 23. The pressure in the conduit 19 between the port 23 and the vacuum motor is thereby lowered to a value which is more nearly equal to that in the conduit 19 between the manifold 20 and the port 22.

When it is desired to disengage the engine clutch while the internal combustion engine 10 is not in operation and the intake manifold cannot thus serve as a vacuum source, the treadle 29 is depressed to bring the end of the valve stem 31 into contact with the web 38 of the link 36 and the treadle 29 is further depressed to slide the link 36 downwardly on the rails 33 to bring the web 38 adjacent the switch button. The link 36 in being thus moved downwardly acts on the washer 39 and moves the rod 17 inwardly with respect to the casing 15 of the vacuum motor and moves the lever 12 to clutch disengaging position.

In order to start the internal combustion engine 10, the treadle 29 may be depressed so as to move the web 38 of the link 36 against the switch button 35 and to move the button inwardly with respect to the switch unit to close the switch and thus connect the leads 40 and 42 to actuate the starter motor 43. It will be noted that when the starter motor 43 is thus actuated, the link 36 serves to hold the engine clutch disengaged, and it is thus impossible for a driver to start the engine 10 while it is connected with the driving wheels of the automobile.

Ordinarily, when the automobile engine is in operation, it is only necessary for a driver to depress the treadle 29 against the spring 32, which is preferably relatively weak, in order to cause the engine clutch to completely disengage or to "slip" as desired. My improved clutch control thus causes a driver a minimum of fatigue during prolonged periods of clutch disengagement, as, for example, when the automobile is being driven in city traffic. My improved clutch control also functions to mechanically disengage the engine clutch and to actuate the engine starter motor, and my improved clutch control thus takes the place of a plurality of ordinary controls which would unnecessarily take up space on the automobile toe board.

I wish it to be understood that I do not intend to limit my invention to the details of construction shown and described except only insofar as the following claims are expressly so limited, and in particular I wish it to be understood that although I have disclosed my invention with an engine clutch and with a control for both by power and mechanically operating the clutch, other means for connecting an engine with its load and operated by such a control is within the scope of my invention where the claims are not expressly so limited.

I claim:

1. In an automotive vehicle, the combination of a starter for the engine of the vehicle, means for effecting a connection between the vehicle engine and its load, power means for operating said engine-load connecting means, and a control for said power means and mechanically linked with said engine-load connecting means for operating it when the power means is incapable of operation, said control being adapted to permit said starter to operate when said engine-load connecting means is inoperative.

2. In an automotive vehicle, the combination of an engine for driving the vehicle, a starter for said engine, means for effecting a connection between the engine and its load, a motor adapted on actuation to operate said means, said engine providing a power supply, and a control for connecting said motor with said power supply and mechanically linked with said means for operating said means when the engine is not in operation, said control being adapted to permit said starter to operate when said means is inoperative.

3. In an automotive vehicle, the combination of a starter for the engine of the vehicle, a load clutch mechanism, power means for disengaging said clutch mechanism, and a control for said power means and mechanically linked with said clutch mechanism for disengaging it when the power means is incapable of operation, said control being adapted to actuate said starter when said clutch mechanism is disengaged.

4. In an automotive vehicle, the combination of an engine for driving the vehicle, a starter for said engine, clutch mechanism for connecting the engine to its load, a motor adapted on actuation to disengage said clutch mechanism, said engine providing a power supply, and a control for connecting said motor with said power supply and mechanically linked with said clutch mechanism for disengaging it when the engine is not in operation, said control being adapted to actuate said starter when said clutch mechanism is disengaged.

5. In an automotive vehicle, the combination of an engine for driving the vehicle and providing a vacuum source when in operation, a starter for said engine, clutch mechanism for connecting the engine to its load, a vacuum motor connected with the vacuum source of said engine for disengaging said clutch mechanism, a valve operatively disposed between said motor and the vacuum source of said engine, and a control for said valve and mechanically linked with said clutch mechanism for sequentially opening said valve and thereafter disengaging said clutch mechanism by said mechanical link, said control being adapted to actuate said starter when said clutch mechanism is disengaged.

6. In an automotive vehicle, the combination of a starter for the engine of the vehicle, power operated means for effecting a connection between the vehicle engine and its load, other means for effecting a connection between the vehicle engine and its load, and a control for said power operated means and mechanically connected with said second named means for operating said second named means when said power operated means is incapable of operation, said control being adapted to permit said starter to operate when the engine and its load are disconnected.

7. In an automotive vehicle, the combination of an engine for driving the vehicle, a starter for said engine, first and second means for effecting a connection between the vehicle engine and its load, said first named means including a motor, said engine providing a power supply, and a control for connecting said motor with said power supply and mechanically connected with said second named means for operating said second named means when said first named means is incapable of operation, said control being adapted to permit said starter to operate when the engine and its load are disconnected.

JOHN M. SIMPSON.